(12) United States Patent
Zytaruk et al.

(10) Patent No.: US 7,953,906 B2
(45) Date of Patent: May 31, 2011

(54) MULTIPLE INTERRUPT HANDLING METHOD, DEVICES AND SOFTWARE

(75) Inventors: Kelly Zytaruk, Georgetown (CA); Conrad Lai, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 217 days.

(21) Appl. No.: 11/676,832

(22) Filed: Feb. 20, 2007

(65) Prior Publication Data

US 2008/0201500 A1   Aug. 21, 2008

(51) Int. Cl.
G06F 3/00 (2006.01)
G06F 7/38 (2006.01)

(52) U.S. Cl. .......... 710/48; 710/260; 710/263; 712/244; 719/318

(58) Field of Classification Search ............ 710/48
See application file for complete search history.

(56) References Cited

U.S. PATENT DOCUMENTS

| | | | | |
|---|---|---|---|---|
| 5,325,536 A * | 6/1994 | Chang et al. | | 710/263 |
| 5,913,071 A * | 6/1999 | Macomber | | 712/40 |
| 6,065,089 A * | 5/2000 | Hickerson et al. | | 710/266 |
| 6,125,404 A * | 9/2000 | Vaglica et al. | | 713/375 |
| 6,529,986 B1 * | 3/2003 | Chen et al. | | 710/263 |
| 7,340,547 B1 * | 3/2008 | Ledebohm | | 710/260 |
| 7,617,389 B2 * | 11/2009 | Nikami et al. | | 712/244 |
| 2002/0083251 A1 * | 6/2002 | Chauvel et al. | | 710/240 |
| 2002/0144004 A1 * | 10/2002 | Gaur et al. | | 709/310 |
| 2005/0120358 A1 * | 6/2005 | Nikami et al. | | 719/318 |
| 2006/0117325 A1 * | 6/2006 | Wieland et al. | | 719/321 |

OTHER PUBLICATIONS

'Embedded Microprocessor Systems Design' by Kenneth Short, copyright 1998 by Prentice Hall.*
'Advanced DPCs' by Mark Russinovich on Microsoft TechNet, published Nov. 1, 2006.*
'Handling Interrupts with Static Scheduling in an Automotive Vehicle Control System' by Sandstrom et al., Fifth International Conference on Real-Time Computing Systems and Applications, 1998.*

* cited by examiner

*Primary Examiner* — Henry W Tsai
*Assistant Examiner* — Steven G Snyder
(74) *Attorney, Agent, or Firm* — Vedder Price P.C.

(57) ABSTRACT

A device, method and software for handling multiple interrupts in a peripheral device are disclosed. The disclosed method includes, upon a hardware event in the peripheral device recording the hardware event and determining an acceptable period before which an interrupt should be generated to service the event. A timer at the peripheral device is adjusted as needed to maintain a value within the acceptable period. Upon expiry of the timer a single interrupt is generated to a processor interconnected to the peripheral device. In response to the single interrupt, software code is executed on the processor to service un-serviced hardware events for which an indicator has been recorded.

26 Claims, 13 Drawing Sheets

MULTIPLE INTERRUPT HANDLING METHOD, DEVICES AND SOFTWARE

FIELD OF THE INVENTION

The present invention relates generally to interrupt handling, and more particularly to a method of handling of multiple interrupts in a device.

BACKGROUND OF THE INVENTION

Modern hardware devices that include a processor and one or more peripheral devices often make use of interrupts. Interrupts provide a useful way of sharing processor time among various software processes and hardware. Often events arise in peripheral devices that occur intermittently but may need to be handled quickly. Rather than wasting processor time by periodically polling a peripheral device to ascertain if an event that needs handling has occurred, a processor may perform other tasks and have the peripheral device signal when an event that needs to be handled occurs, by way of an interrupt request.

An interrupt request thus asynchronously signals a processor that requires some processor service is required. Typically each interrupt has an associated piece of code called an interrupt service routine (ISR). Upon receiving an interrupt request signal the processor identifies and executes the ISR associated with the received interrupt request.

To do so, the processor typically determines the source of the interrupt, saves the current state of the processor, and executes the remainder of the ISR. Data in the processor's registers, representative of the current state, are stored in a memory such as a stack before and later retrieved after the ISR is completed. Clearly, executing an ISR requires processor overhead.

Multiple interrupt requests require a mechanism to handle each interrupt. Two or more interrupts requests may also be received simultaneously. Moreover, a new interrupt may be received by the processor while an earlier interrupt is being handled. Thus, priorities are often assigned to different types of interrupts and higher priority interrupts may interrupt lower priority ones, and are thus serviced prior to lower priority ones. If an interrupt of a higher priority is received while an ISR associated with a lower priority interrupt is being executed, the ISR of higher priority interrupt commences execution immediately. After the higher priority ISR is completed, the lower priority ISR is resumed.

Although interrupts provide a useful way to share processing time efficiently, some peripheral devices may interrupt the processor too frequently. This often leads to system performance degradation resulting from overhead associated executing associate ISRs.

Of course, other software processes executing on the processor must compete with ISRs for processor time. Excessive generation of interrupts by a poorly designed peripheral device, or a poorly written ISR that takes too long to complete, limits the amount of time the processor devotes to executing other applications, which in turn leads to degradation of overall performance.

Accordingly, there is a need for a flexible and efficient interrupt generation and handling technique that may reduce the impact of excessive interrupts on system performance.

SUMMARY OF THE INVENTION

In accordance with an aspect of the present invention there is provided a method of servicing multiple hardware events in a peripheral device by a processor in a computing device. The method includes, upon a hardware event, recording the hardware event and determining an acceptable period before which an interrupt should be generated to service the hardware event. If the acceptable period is smaller than a current value of a timer, the timer is adjusted to a value within the acceptable period. Upon expiry of the timer, a single interrupt to the processor is generated. In response to the single interrupt, software code is executed on the processor to service un-serviced hardware events for which an indicator has been recorded.

In accordance with another aspect of the present invention there is provided a computing device comprising a processor and memory storing software executable by the processor. The software adapts the computing device to execute an interrupt service routine (ISR) to identify multiple hardware events in the peripheral device to be serviced, in response to receiving an interrupt request from the peripheral device. The device executes multiple software code portions, each for servicing one the hardware events in the peripheral device.

In accordance with another aspect of the present invention there is provided a peripheral device, including a microcontroller executing device firmware, the firmware adapting the peripheral device to maintain a timer and upon a hardware event, to record an indicator of the hardware event and determine an acceptable period before which an interrupt should be generated to service the hardware event. The firmware further adapts the microcontroller to adjust the timer to a value within the acceptable period, if the acceptable period is smaller than a current value of the timer. The firmware further adapts the microcontroller to generate a single interrupt to the processor upon expiry of the timer.

In accordance with yet another aspect of the present invention there is provided a computing device comprising a processor interconnected to a peripheral device through an interrupt request line, and memory storing software executable by the processor. The peripheral device includes a microcontroller executing device code adapting the peripheral device to generate a single interrupt to the processor, in response to a plurality of hardware events originating in the peripheral device. The software adapts the processor to execute an interrupt service routine (ISR) to identify the plurality of hardware events in the peripheral device corresponding to the interrupt request and also execute software code portions too services one of the hardware events.

In accordance with yet another aspect of the present invention there is provided a computer readable medium storing microcontroller executable instructions for adapting a peripheral device including a microcontroller to maintain a timer to generate a single interrupt to a processor interconnected to the peripheral device, in response to a plurality of local hardware events originating in the device, within a period acceptable to each of the hardware events.

In accordance with yet another aspect of the present invention there is provided a computer readable medium storing processor executable instructions for adapting a computing device comprising a processor and memory. The processor executable instructions when loaded onto the memory adapt the computing device to execute an interrupt service routine comprising software code to identify and service each of a plurality of hardware events. The processor executable instructions are executed in response to receiving an interrupt request from a peripheral device associated with the hardware events in the peripheral device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
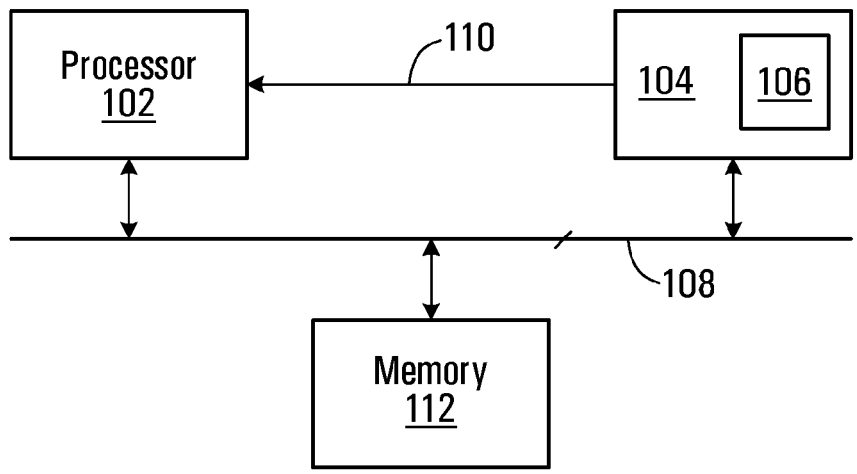
FIG. 1 is a schematic diagram of a computing device including a processor, memory and a conventional peripheral device and software.

FIG. 1 schematically depicts a computing device 100 which includes a processor 102, memory 112 and a conventional peripheral device 104. Processor 102, peripheral device 104 and memory 112 are typically interconnected by way of a bus 108. An interrupt request line 110, which may form part of bus 108, may be used to send an interrupt signal from peripheral device 104 to processor 102.

Processor 102 may have an Intel x86 based architecture. Bus 108 may be a peripheral component interconnect (PCI) bus, a PCI express (PCIe) bus, or any other suitable bus. Multiple processors and many peripheral devices may reside in computing device 100. Peripheral device 104 may include an ASIC 106 with an appropriate interface for utilizing bus 108. Computing device 100 may also include operating system software 200 loaded in memory 112.

Figure 2:
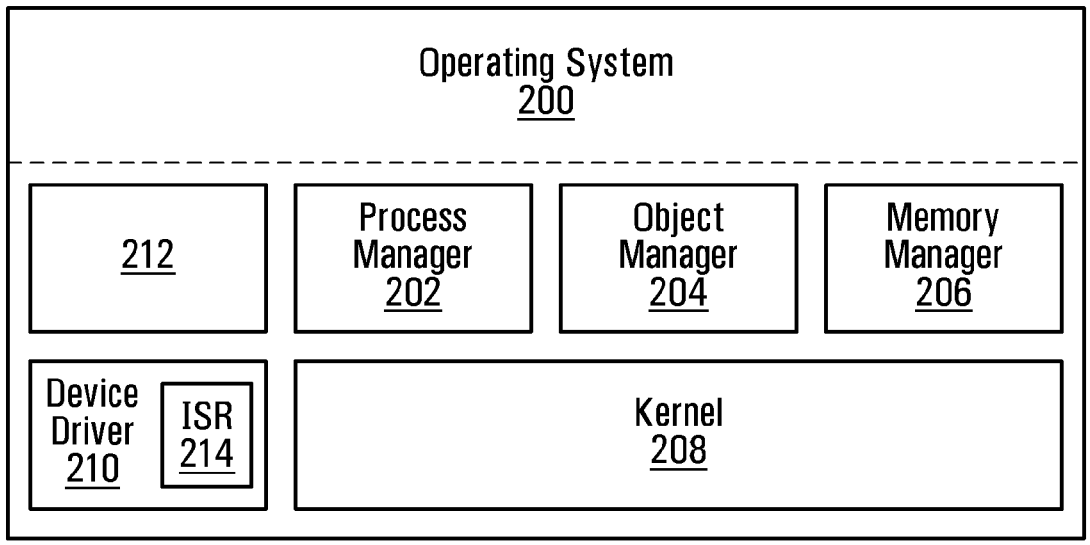
FIG. 2 is a block diagram of an operating system software for the computing device of FIG. 1 including a conventional device driver.

As depicted in FIG. 2, operating system software 200 may include a process and thread manager 202, a kernel 208, an object manager 204, a graphic subsystem 212, a memory manager 206, and a device driver 210 for peripheral device 104. Device driver 210 includes an interrupt service routine (ISR) 214. Device driver 210 may be loaded into memory 112 at device startup or when required and may be unloaded when no longer needed.

Peripheral device 104 of FIG. 1 generates interrupts. Peripheral device 104 may, for example, be a video graphics adapter, a sound interface, a network interface, a modem or the like. In the exemplary embodiment, bus 108 may be a peripheral component a PCI express (PCIe) bus, and peripheral device 104 may be a PCIe video graphics adapter. The interrupts may, for example, originate with ASIC 106 within peripheral device 104, and be signaled by way of interrupt requests. As noted, an interrupt request is an asynchronous signal sent to processor 102, when peripheral device 104 requires some service from processor 102. Interrupts requests may be sent to processor 102 via interrupt line 110.

Interrupts are processed based on priority. Higher priority interrupts cannot be interrupted by lower priority ones, while lower priority interrupts may be further interrupted by higher priority interrupts. In the current architecture there are 32 interrupt levels labeled level 0 to level 31. Priority levels 3-26 are called DEVICE level, and are typically used for hardware interrupts such as interrupts from peripheral devices. Software interrupts, are assigned priority levels 1 and 2.

One class of software interrupts are serviced by deferred procedure calls (DPCs). Software interrupts serviced by DPCs are typically invoked by ISRs, and execute while the processor is at interrupt request level 2—known as DISPATCH level. Software interrupts are serviced once higher level hardware interrupts have been serviced. Software interrupts nevertheless pre-empt other executing threads. Ordinary threads may be considered to have a priority level of 0 which is known as PASSIVE level.

Higher priority levels 27-31 may be used for specific interrupts. For example, priority level 28 may be used for a real-time clock.

Interrupt servicing in modern Intel x86 based computing machines running the Windows® operating system, typically involves the use of an interrupt service routine (ISR), and may also involve a deferred procedure—called Deferred Procedure Call (DPC) in Windows®—and use of conventional threads (known as "worker threads"). An ISR executes to service an interrupt at DEVICE level priority. As noted above, DEVICE level interrupts typically originate in a peripheral device. To service a DEVICE level interrupt, the processor first elevates its interrupt request level (IRQL) to DEVICE level thereby preventing interrupts of lower level from interrupting it, and executes the ISR associated with the received interrupt. In order to spend as little time as possible at an elevated interrupt request level (IRQL) i.e. at DEVICE level, a processor usually performs minimal interactions with its respective peripheral device, when executing an ISR—normally just reading state information and signaling the device to stop interrupting. While the processor is executing an ISR, only another interrupt of higher priority level may cause interrupt the current ISR. An ISR can finish processing at a lower IRQL by requesting a DPC. As will become apparent, this may be done by making a specialized, operating system supplied, function call. As noted, DPCs have DISPATCH priority level. After an ISR requests a DPC, its DPC function or deferred procedure will be scheduled to execute on the processor, by the operating system. When the DPC function is executing, it may in turn, request a worker thread so that processing can continue at PASSIVE level. As a DPC's priority level (DISPATCH level), is below that of a hardware interrupt (DEVICE level), processor 102 may respond to device interrupts (by invoking corresponding ISRs) while a deferred procedure call is executing.

In operation, device driver 210 registers its interrupt service routine (ISR) 214 with kernel 208 when loaded by operating system 200. When an interrupt request from device 104 is received, operating system 200 invokes ISR 214 to service the interrupt.

Figure 3:
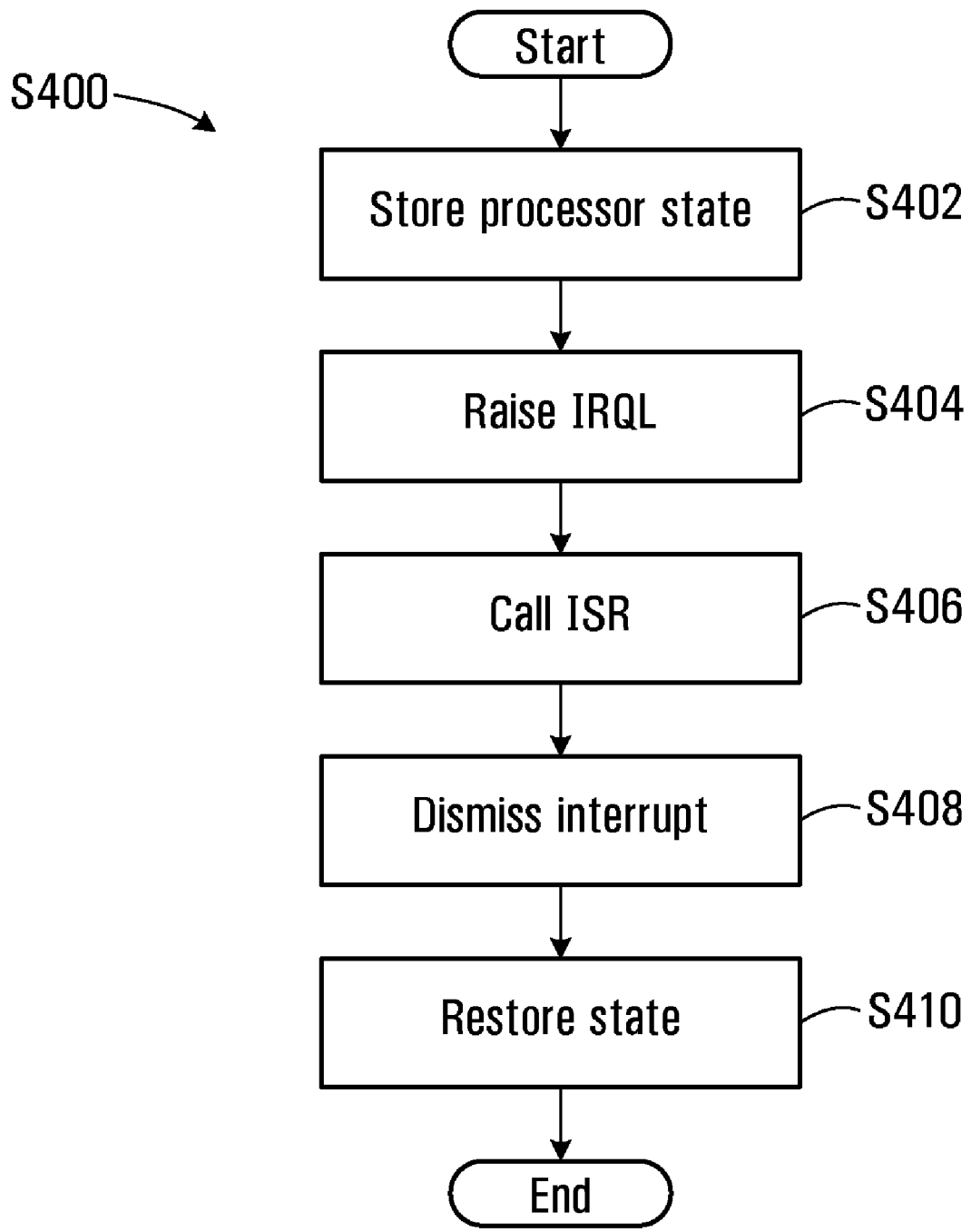
FIG. 3 is a flowchart illustrating the various steps executed by the operating system to service interrupts in the computing machine of FIG. 1.

Steps S400 in FIG. 3 depict the steps taken by operating system 200 to handle an interrupt request by processor 102. Upon receiving an interrupt request, processor 102 saves the system state (e.g., processor registers, etc.) in step S402, and raises the current interrupt request level (IRQL), which blocks or masks interrupts of lower or equal priority (step S404). Different operating systems and processors may provide their own implementations of masking lower priority interrupts. Operating system 210 then calls the associated interrupt service routine (ISR) 214 in step S406 to service the interrupt, and subsequently dismisses the interrupt (step S408). Finally operating system 210 restores the system state in step S410. Any thread, DPC or ISR that may have been executing prior to being interrupted by steps S400 may then resume execution.

Figure 4:
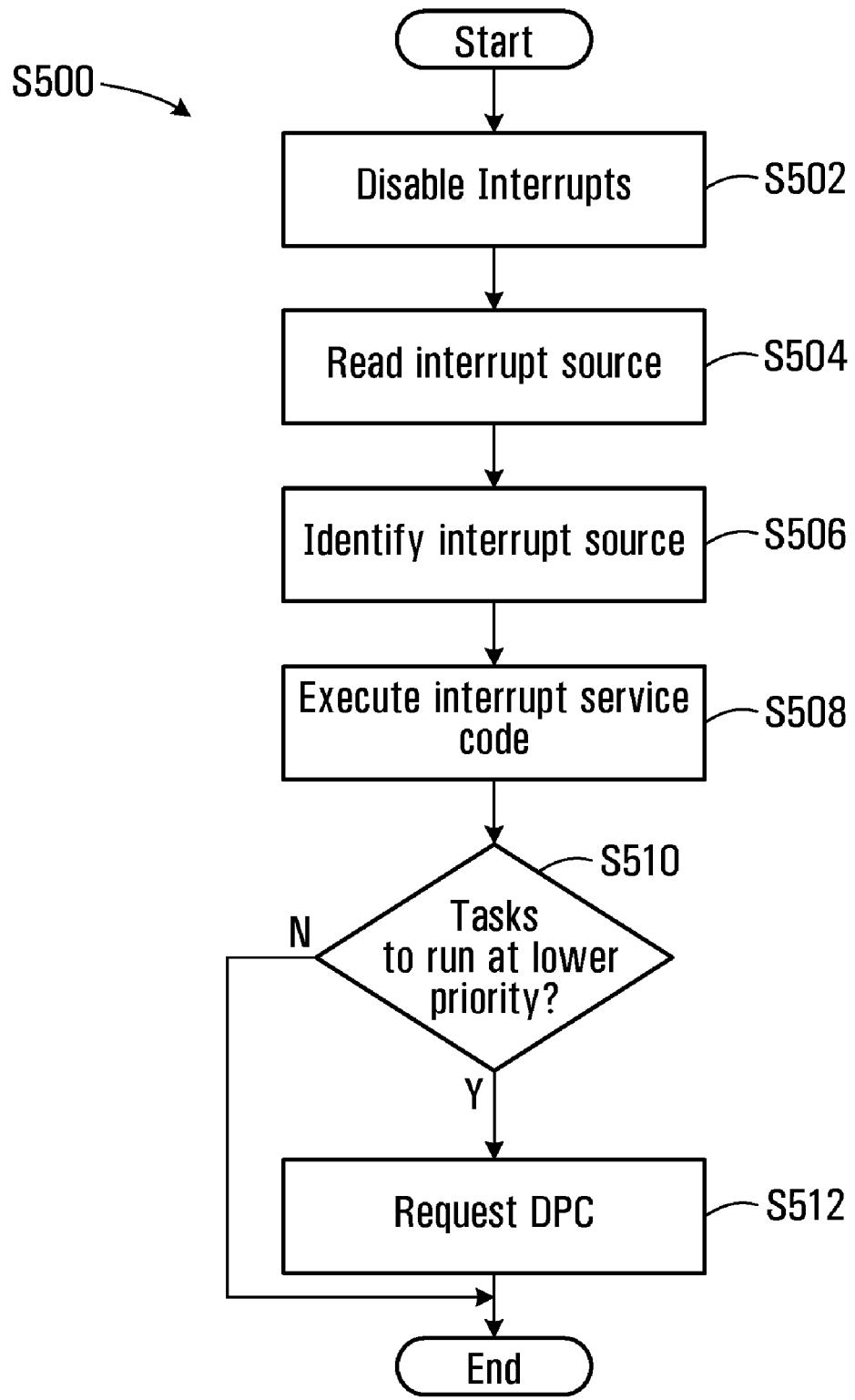
FIG. 4 is a flowchart illustrating various steps taken by an interrupt service routine (ISR) for the conventional peripheral device of FIG. 1.

Steps S500 in FIG. 4 depict the steps taken by ISR 214 to service an interrupt, within step S406 of FIG. 4. In S502, ISR 214 disables further interrupt generation by device 104. In S504, ISR 214 identifies the source of the interrupt within the device (S506) by, for example, reading device registers. In S508 ISR 214 executes code required to service the interrupt. As execution of ISR 214 pre-empts lower level interrupts, ISR 214 may defer any non-critical routines by requesting a deferred procedure call (DPC) in steps S510 and S512. After ISR 214 completes, and no higher level interrupts are pending processor 102 resumes executing the interrupted thread, DPC or ISR of lower priority.

Figure 5:
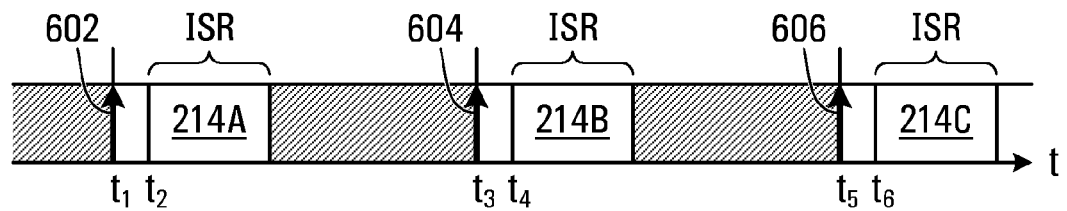
FIG. 5 is a simplified timing diagram illustrating interrupt generation and interrupt handling in the computing device of FIG. 1.

FIG. 5 depicts a simplified timing diagram illustrating the sequence of interrupt generation and interrupt handling in conventional device 100. Peripheral device 104 generates multiple interrupt requests 602, 604, 606, each of which is provided to processor 102 as generated at time t1, t3, t5. Processor 102 handles interrupt 602 by executing ISR 214A for device 104 at time t2. Processor 102 similarly handles interrupts 604, 606 by executing ISRs 214B, 214C at times t4, t6 respectively. The average delay between the instant an interrupt is generated and its subsequent handling may be considered the interrupt handling overhead (or interrupt latency).

As noted, interrupt handling mechanisms rely to some extent, on a self-policing arrangement whereby each interrupt service routine (ISR), relinquishes control of a processor 102 within a reasonable time frame. Typically, once an ISR is executed by processor 102 it only relinquishes the processor after executing a quantum of work that should be completed without being interrupted by another task of equal or lower priority. Unfortunately, a poorly written ISR 214 may take too long to relinquish processor 102 and cause other tasks (including other interrupts from peripheral device 104) to wait for an unduly long time. This in turn causes the overall system to degrade in performance. The same may be true of a poorly designed DPC.

As a result, some operating systems such as Windows Vista™ from Microsoft Corporation of Redmond, Wash., USA, specify maximum time limits allowed for a given ISR or DPC to run to completion. In a conventional device such as device 104, each hardware event that needs some service from the processor triggers an interrupt signal to processor 102. Hardware events are thus internal to a device. If two or more hardware events in device 104 can be serviced within the maximum time allowed, then it may be advantageous to send one interrupt signal to the processor (instead of one interrupt per hardware event). Thus, the processor could invoke one ISR instance to service multiple hardware events in a peripheral device. Similarly a single DPC may be used to execute deferred tasks associated with handling multiple hardware events. As may be appreciated, this would improve system performance.

In addition to ISRs that take too long to execute, potential performance degradation can also occur if peripheral device 104 generates an excessive number of interrupts. Multiple interrupts may be generated by peripheral device 104, leading to multiple invocations of the associated ISR to service each interrupt. It is easy to see that an overhead is associated with each interrupt, including the generation of the interrupt, identifying the appropriate ISR, storing processor registers and other state variables, setting and clearing interrupt registers, and restoring state variables. Instead, it may be efficient to have the flexibility of sending just one interrupt to processor 102 and correspondingly invoke just one instance of the ISR 214, in response to multiple hardware events that may be initiated by ASIC 106.

Figure 6:
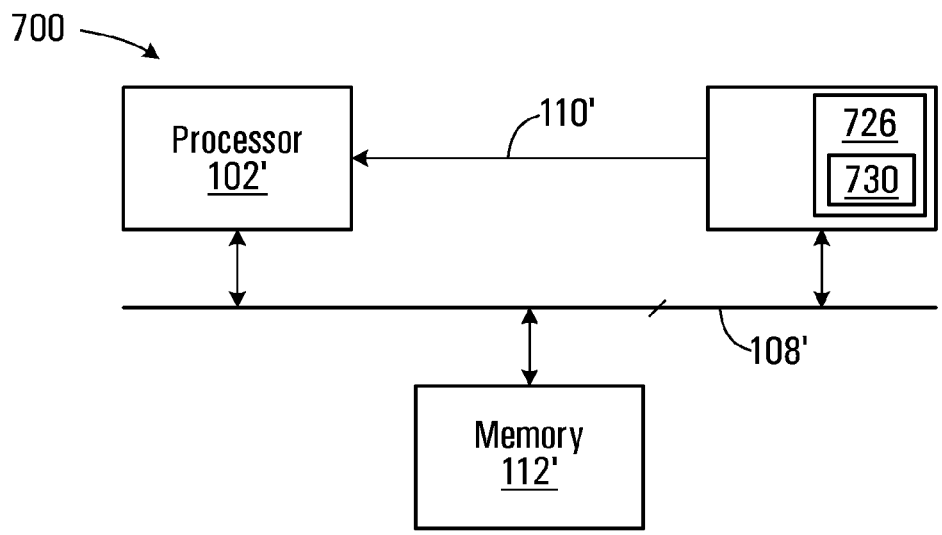
FIG. 6 is a schematic diagram of a computing device including a peripheral device, exemplary of an embodiment of the present invention.

Accordingly, FIG. 6 depicts a computing device 700, exemplary of an embodiment of the present invention that overcomes shortcomings identified in conventional computing device 100. Computing machine 700 includes a processor 102', a peripheral device 720 and memory 112'. Processor 102', memory 112' and a peripheral device 720 may be interconnected by way of a bus 108'. An interrupt request line 110', which may form part of bus 108', may be used to send an interrupt signal from peripheral device 720 to processor 102'.

Processor 102', memory 112', bus 108' and interrupt request line 110' in computing machine 700 may be conventional, like processor 102, memory 112, bus 108, and interrupt request line 110 in computing machine 100 respectively. Additional interrupt lines (not shown) may interconnect processor 102' to peripheral device 720.

Processor 102' may again have an Intel x86 based architecture. Bus 108' may be a PCI bus, or a PCI express bus. Memory 112' may be loaded with an operating system 702.

Figure 8:
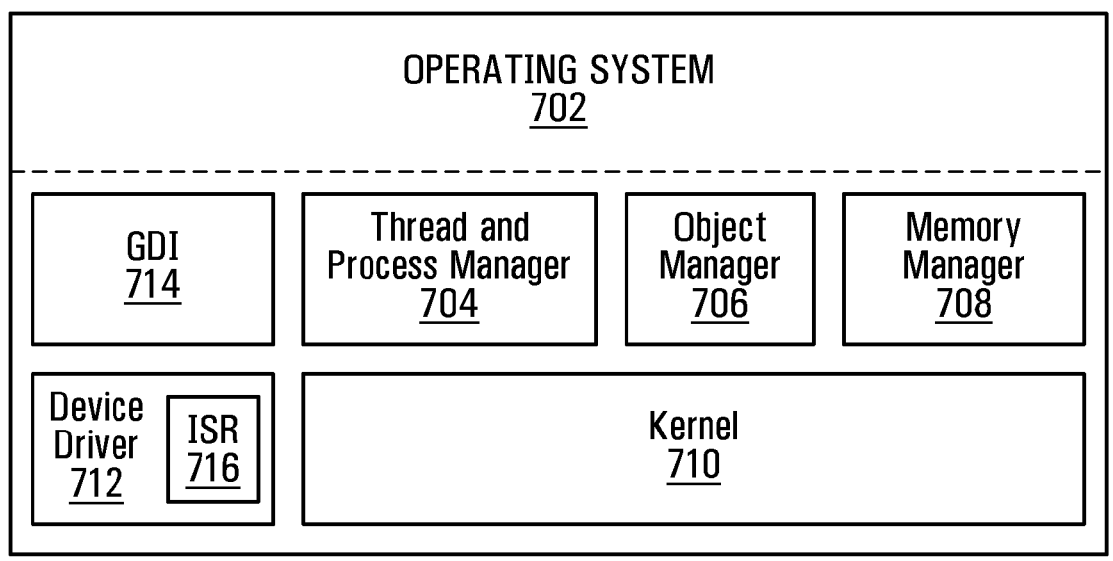
FIG. 8 is a block diagram of an operating system software for the computing device of FIG. 6 including an operating system kernel and a device driver for the peripheral device.

Peripheral device 720 may include an ASIC 726. As depicted in FIG. 8, ASIC 726 may in turn include an embedded microcontroller 730, pending hardware event status register 732 and a local memory 722. Hardware event status register 732 may include status bits 732A, 732B . . . corresponding to different hardware events. Examples of a hardware event in a graphics adapter card include a vertical-blank event that is initiated when a display scan line enters the vertical blank region; or a display hot-plug event which may be generated when a flat-panel display is attached to the graphics card's display interface. ASIC 726 may also include a logic unit 106' that may be similar to conventional ASIC 106 of peripheral device 104. Device firmware 724 contains microcontroller executable instructions and may reside in local memory 722. Alternately, device firmware 724 may be loaded into memory 722 from an external computer readable medium such as compact disk or a floppy disk. Microcontroller 730 and local memory 722 may thus form part of a device interrupt interface 728 between logic unit 106' and processor 102'.

FIG. 8 depicts a block diagram of operating system 702 which may include a kernel 710, a process and thread manager 704, a memory manager 708, a graphics subsystem 714 and a device driver 712. Device driver 712 provides low level software interface with the hardware for peripheral device 720 including an ISR 716.

Operating system 702 may, for example, be the Windows Vista™ operating system that specifies maximum time limits for an ISR and a DPC to execute to completion. The maximum time limit for an ISR to execute to completion is called the 'ISR Time Limit'. The maximum time limit for a DPC to execute to completion is called the 'DPC Time Limit'. The ISR Time Limit may be 25 μs while the DPC Time Limit may be 100 μs.

Figure 9:
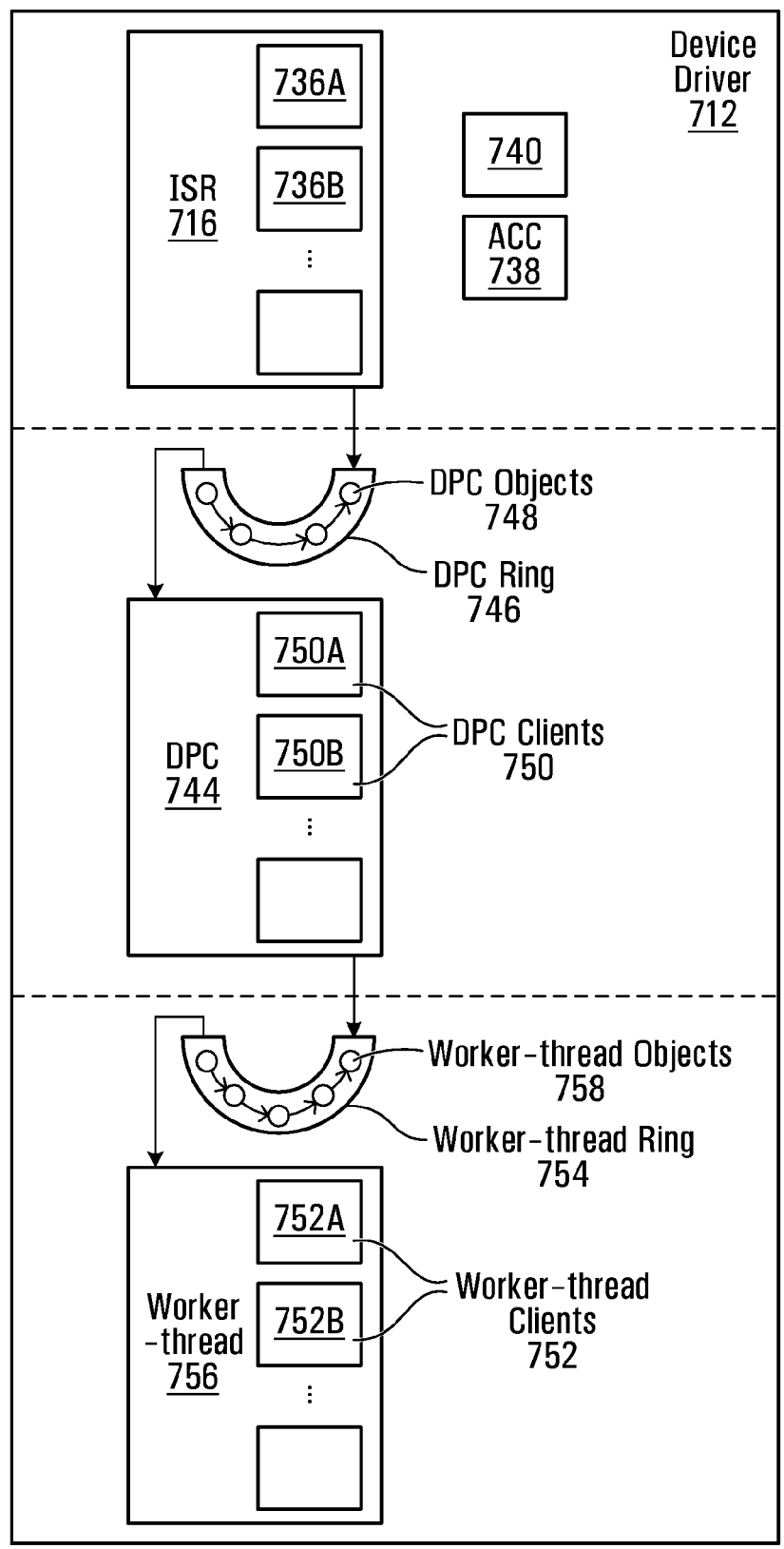
FIG. 9 is a block diagram of software components and data structures in the device driver of FIG. 8.

FIG. 9 schematically depicts various software components that may be found in device driver 712 and data structures that may be used. Device driver 712 may include ISR 716, local ISR code-portions 736A, 736B . . . (individually and collectively ISR code portions 736), DPC 744, local DPC code-portions 750A, 750B . . . (individually and collectively DPC code portions 750), worker-thread 756 and worker-thread code-portions 752A, 752B . . . (individually and collectively worker-thread code-portions 752). Device driver 712 containing processor executable instructions may, of course, be stored in an external computer readable medium such as a compact disk (CD) and installed on operating system 702 for use with peripheral device 720.

Data structures such as interrupt source storage 740, a dpc-ring 746, and worker-thread ring 754 may be used by device driver 712 and its components. Dpc-ring 746 may contain local dpc-objects 748A, 748B, (individually and collectively 748). Worker-thread ring 754 may contain worker-thread objects 758A, 758B . . . (individually and collectively 758).

Figure 10:
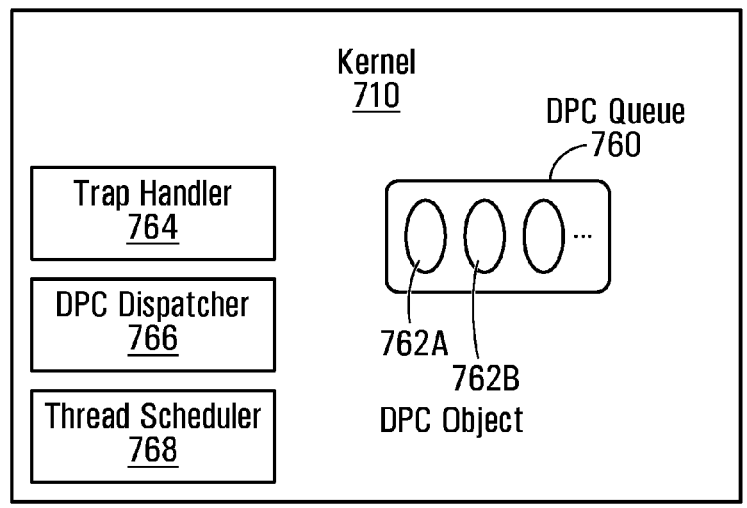
FIG. 10 is a block diagram of software components and data structures in the operating system kernel of FIG. 8.

FIG. 10 depicts various software components of kernel 710 and some data structures that are used by kernel 710. Specifically, kernel 710 may include a trap handler 764, a DPC dispatcher 766 and a thread scheduler 768 and may use the depicted data structures including a DPC QUEUE 760, and DPC OBJECTS 762A, 762B . . . (individually and collectively DPC OBJECTS 762).

For convenience of notation, local data structures created by device driver 712 are denoted using small letters (e.g. dpc-object, dpc-ring, etc.) while those used by kernel 710 are capitalized (e.g. DPC OBJECT, DPC QUEUE etc.).

Figure 11:
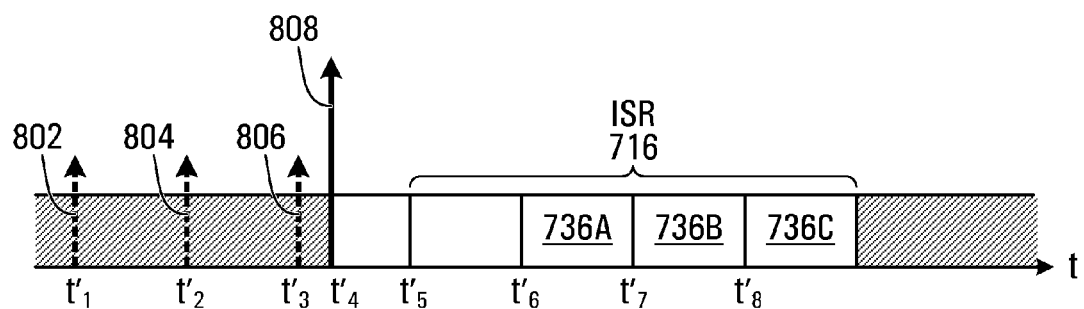
FIG. 11 is a simplified timing diagram illustrating interrupt generation and interrupt handling, exemplary of an embodiment of the present invention.

Accordingly, FIG. 11 depicts a timing diagram analogous to FIG. 5 illustrating interrupt generation and handling in exemplary peripheral device 720. As noted, logic unit 106' is similar to conventional peripheral device 104 of FIG. 6. Logic unit 106' generates hardware events 802, 804, 806 at times t1' t2', t3'.

As noted above, hardware events are internal to device 726, but do not necessarily directly interrupt processor 102'. In conventional computing device 100, each hardware event leads to an interrupt. However, in computing device 700, hardware events 802, 804, 806 are received by device interrupt interface 728, and may thus remain internal (or local) to device 720. For example, hardware events 802 and 804 do not each immediately trigger an interrupt signal. Instead, ASIC 726 through its device interrupt interface 728, generates a single interrupt 808 to processor 102' at time t4' in response to multiple local hardware events 802, 804, 806.

Processor 102' (FIG. 11) thus only receives one interrupt at time t4'. In response to interrupt 808, processor 102' may execute a single instance of interrupt service routine (ISR) 716 at time t5'. ISR 716 in turn runs ISR code-portions 810, 812 and 814, within device driver 712 at times t6', t7', t8' respectively. ISR code-portions 810, 812 and 814 service hardware events 802, 804, 806 respectively by performing the same or similar tasks as those performed by ISR instances 214A, 214B, 214C in FIG. 6, but within a single instance of ISR 716.

Figure 7:
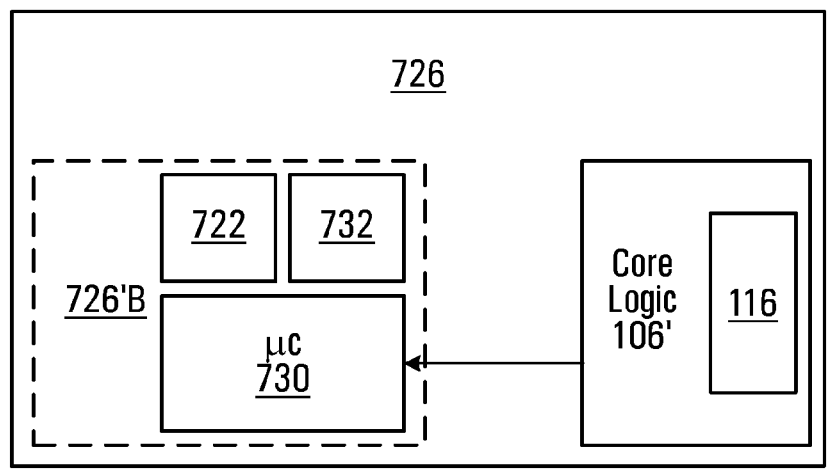
FIG. 7 is a schematic diagram of various blocks inside an ASIC on the peripheral device of FIG. 6 exemplary of an embodiment of the present invention.

To provide the flexibility to aggregate multiple hardware events 802, 804, 806, from logic unit 106' and generate a single interrupt request to processor 102', a device interrupt interface 728 as depicted in FIG. 7 may be implemented using microcontroller 730 executing firmware 724.

In operation, device driver 712 may initialize a table of interrupt event identifiers and their associated allowed latency periods. An example is provided in TABLE I. ASIC 726, reads TABLE I stored in memory accessible to ASIC 726, to schedule the time for asserting the interrupt line. In an exemplary embodiment, TABLE I may reside in system memory 112'.

TABLE I

| Interrupt Event ID | Latency |
|---|---|
| VBLANK | 20 μs |
| FP_HOTPLUG | 50 ms |
| . | . |
| . | . |
| . | . |

In TABLE I, the Interrupt Event ID column lists numeric identifiers associated with hardware events that may be triggered in ASIC 726. The latency column provides maximum acceptable period that may elapse before the corresponding hardware event is serviced. Interrupt line 110' should thus be asserted within a specified acceptable period after occurrence of the hardware event.

The specification of maximum acceptable period (or maximum latency period) for each hardware event allows the timely handling of hardware events which may require relatively fast service. For example, a vertical blank event must interrupt the host while a display scan line is still in the vertical blank region. Accordingly, as depicted in TABLE I, the latency allowed may be just a few tens of microseconds. However, a flat-panel display hot-plug may allow a latency period in the order of milliseconds.

To generate interrupts in a timely manner, ASIC 726 may include a timer. A timer register may be initialized to a count value corresponding to a desired duration (i.e., an associated acceptable period) and decremented every cycle (or every N cycles). When the register value is 0, then an interrupt signal is generated. For a desired latency duration of L seconds, for example, the register may be initialized to R=L/T (where T is the clock period in seconds) and decremented every clock cycle.

If a new hardware event with a smaller acceptable period is observed, then the timer register would be immediately set to a new smaller value corresponding to the new smaller period. This ensures that an interrupt will be generated before the specified latency period expires for any of the hardware events awaiting interrupt service.

Figure 12:
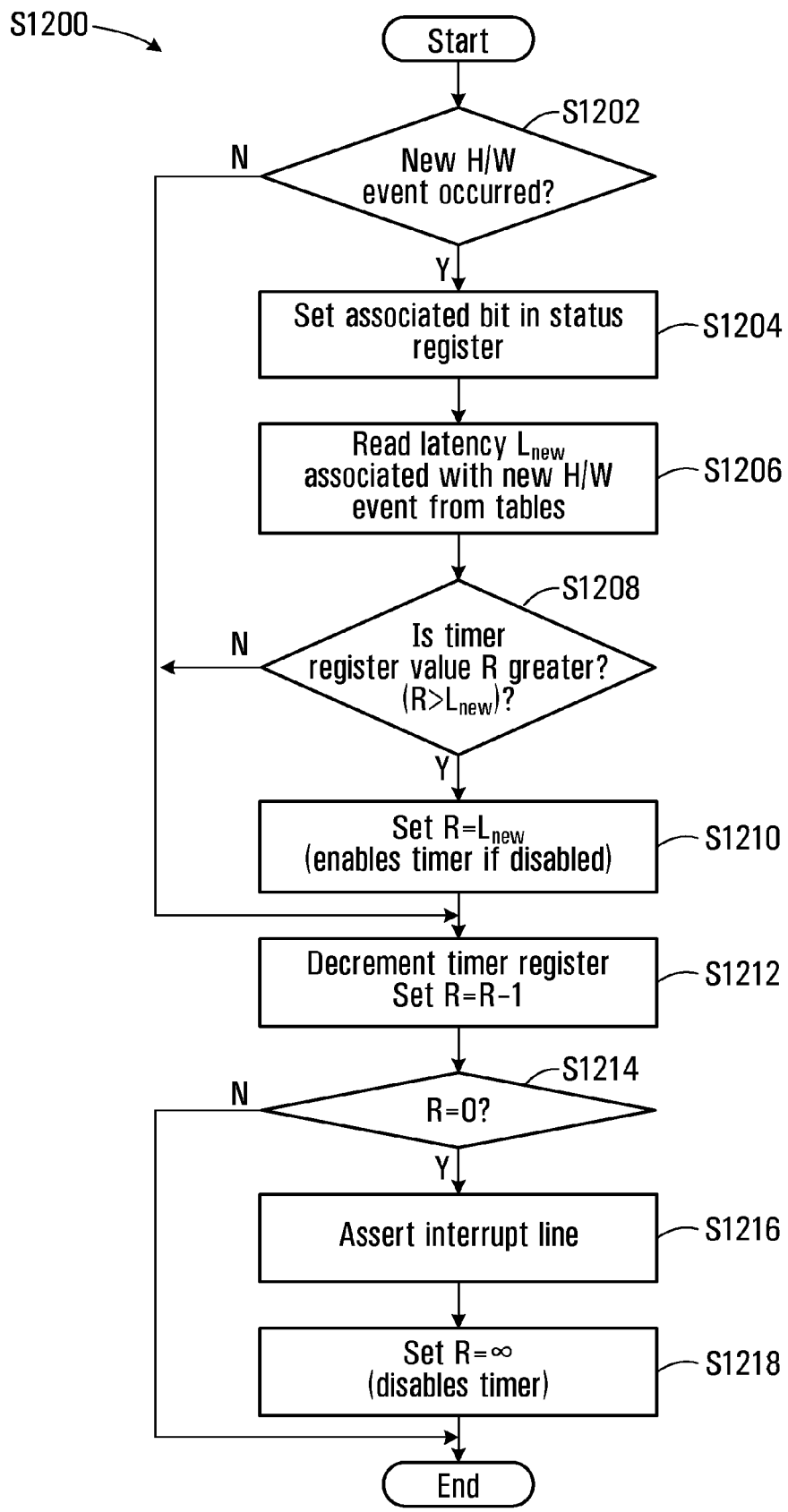
FIG. 12 is a flowchart illustrating steps taken by an exemplary ASIC in the peripheral device of FIG. 6 to provide an interrupt interface to an interconnected processor.

FIG. 12 depicts a flowchart illustrating steps S1200 periodically performed by ASIC 726 at regular intervals defined with respect to the period a clock signal used in ASIC 726 (e.g., every clock cycle or every few clock cycles). At each interval, ASIC 726 examines if a new hardware event has occurred (S1202) and if so records the hardware event by setting the appropriate status bit (S1204) in a status register which will be interrogated by device driver 712. ASIC 726 then reads the latency $L_{new}$ (S1206) associated with the new hardware event, from TABLE I, in memory. If the timer register value (denoted R) is greater than latency $L_{new}$ (S1208) then as noted above the register value is set to $L_{new}$ (S1210). This may also enable the timer, if already disabled. The timer register is decremented (S1212).

If the value of the timer reaches 0 (S1214), then an interrupt signal is sent to processor 102' (S1216) and the timer disabled (S1218). After an interrupt signal is generated, the register may be set to a predetermined non-zero value and the timer disabled (i.e., register value not decremented). Disabling the timer has achieves in practice, the same effect as theoretically setting the timer register value to infinity (S1218). Upon a subsequent hardware event after an interrupt has been sent, the register may be set to the new event's corresponding maximum acceptable period, and the timer enabled (i.e., the timer register would now be decremented every clock cycle).

Device driver 712 defines ISR 716, DPC 744 and Worker-thread 756 in a manner complementary to the above interrupt generation mechanism. ISR 716 may service two or more hardware events (which result in single interrupt to processor 102') if the combined execution time of the associated ISR-code portions are with in the limit imposed by the operating system.

To that end, device driver 712 keeps a statistical table of execution times associated with each hardware event in a table such as TABLE II below. The table is then used to calculate average execution times. Average values are used to determine how many ISR code-portions may fit into one execution of an ISR.

TABLE II

| Hardware Event | Total Execution time | | Count | | Average Execution Time | |
|---|---|---|---|---|---|---|
| | ISR | DPC | ISR | DPC | ISR | DPC |
| VBLANK | | | | | | |
| FP_HOTPLUG | | | | | | |
| . | | | | | | |
| . | | | | | | |
| . | | | | | | |

Once an interrupt signal is asserted on line 110', processor 102' responds by transferring control to trap handler 764 in kernel 710. Trap handler 764 runs in response to interrupts and exceptions, to locate and transfer control to software that is responsible for handling the interrupt. Thus, in response to an interrupt, trap handler 764 transfers control to ISR 716 for device 720. As noted, ISR 716 is provided by device driver 712 to kernel 710 upon loading.

Figure 13:
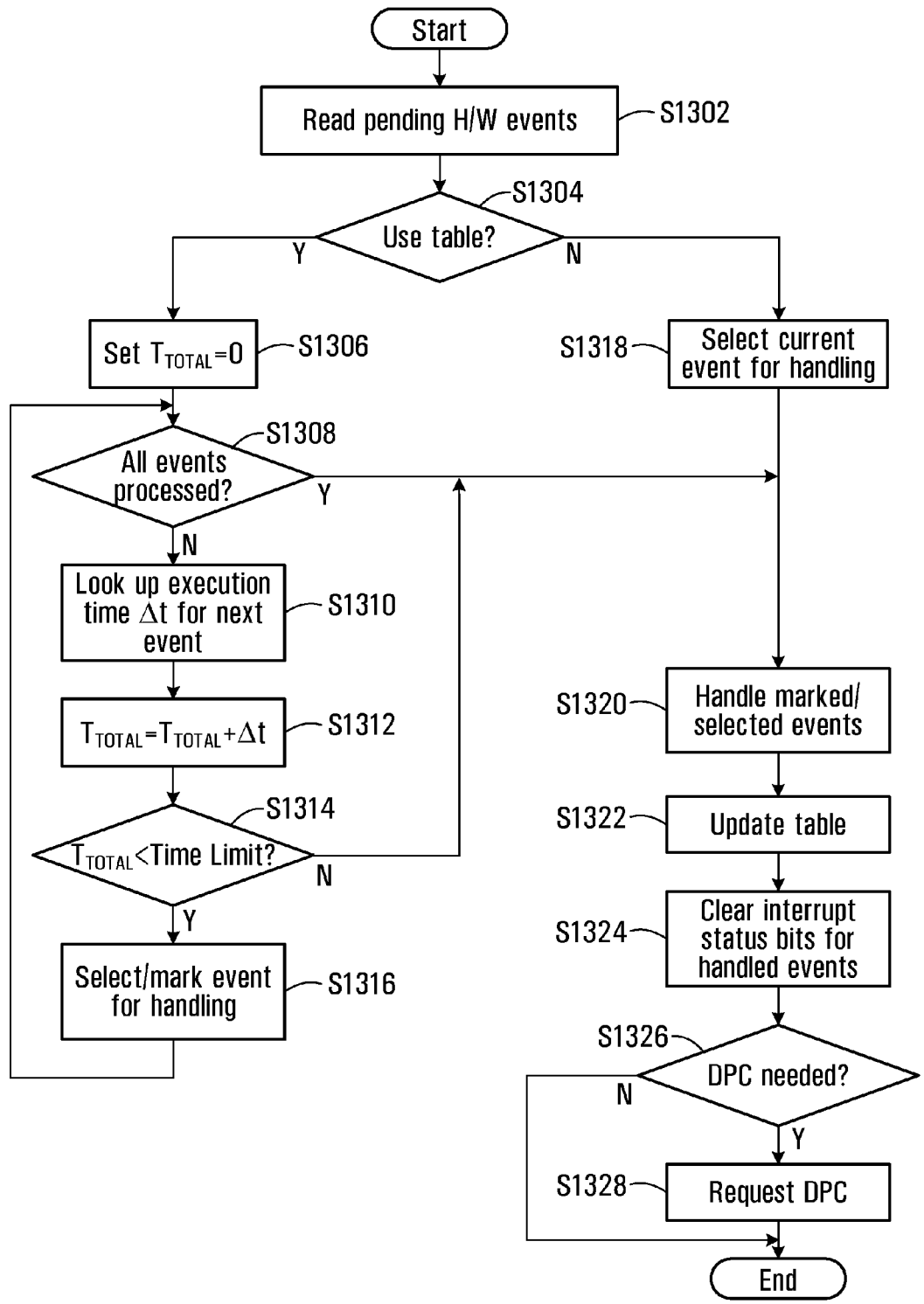
FIG. 13 is a flowchart depicting the execution steps of an exemplary interrupt service routine (ISR), for interrupts generated by of the peripheral device of FIG. 6.

Specifically, upon an interrupt signal from ASIC 726, device driver 712 may perform the steps S1300 depicted in FIG. 13. ISR 716 reads ASIC hardware event status register (S1302) to identify the hardware events that caused the interrupt. ISR 716 caches the value the hardware event status register, and uses the cached value to process hardware events that have already been recorded. If the table of ISR execution times is ready for use (S1304), ISR 716 may initialize a storage $T_{TOTAL}$ (S1306) used to calculate the total time needed to service the hardware events.

As can be appreciated, initially TABLE II is either empty or has not accumulated enough statistical data to provide reliable estimates of execution times. As processor architecture, available memory and other resources vary with different computing devices, execution times are not known a priori. The execution time estimates improve with more invocations of ISR 716. After a sufficient number of invocations of the ISR, the computed average execution times in TABLE II will be sufficiently reliable for use and the table is may be used (S1304).

If the table of execution times is ready for use and $T_{TOTAL}$ is initialized (S1306), when there are hardware events to be processed (S1308) the execution time associated with the current hardware event's ISR-code portion (Δt) is read from TABLE II (S1310). $T_{TOTAL}$ is incremented to account for this time (S1312). If the ISR Time Limit has not been reached (S1314) the hardware event is marked or selected for servicing in the current ISR invocation (S1316) and the next hardware events (if any) are examined (S1308, S1310).

If the either the ISR Time Limit is reached (S1314), or all events are found to fit within the ISR time limit (S1308), then the events selected for servicing in the current instance of ISR are handled (S1320) and the table of execution times updated with the most recent execution time statistic (S1322). Interrupt status bits associated with serviced hardware events are cleared (S1324). If a DPC is needed by any of the handled events, ISR 716 requests a DPC (S1326, S1328). ISR 716 may call a kernel supplied function to insert a kernel DPC OBJECT in a DPC OBJECT QUEUE 760 maintained by kernel 710.

If the table of execution times (TABLE II) is not ready for use (S1304) then ISR 716 simply identifies the first hardware event from the status register and services the hardware event (S1318, S1320). The table of execution times is still updated (S1322). When sufficiently reliable data has been accumulated, the table may be ready for use on the next invocation. The decision to use the table may be based on how many times ISR 716 has run.

Conveniently, when ISR 716 exits, any hardware events that have not been serviced (i.e., have not had their ISR code-portions executed by processor 102') would still have their corresponding hardware event status bits set within register 732 in ASIC 726. ISR 716 only clears the status bits of hardware events that have been handled. Consequently if yet-to-be-serviced hardware events are pending, ASIC 726 will again immediately send an interrupt to processor 102' when ISR 716 exits. Thus, ISR 716 will be invoked again to service the remaining hardware events.

Advantageously, if hardware events need not be serviced in their order of arrival and the table of execution times is ready for use, then ISR 716 may service a determined subset of the hardware events for which the corresponding ISR code-portions can be executed within predetermined ISR time limit. For example, suppose ISR 716 is invoked to service three hardware events that are recorded consecutively, with corresponding execution times of T1, T2 and T3. If T1+T2 exceeds the predetermined ISR time limit, and T2+T3 also exceeds the predetermined ISR time limit, but T1+T3 is less than the predetermined ISR time limit, then ISR 716 may service the first and third hardware events only and exit. Upon subsequent invocation, ISR 716 will service the remaining (second) hardware event. This would be a more efficient way of servicing hardware events than processing them in their order of arrival which would require three (i.e., one more) invocation of ISR 716.

In alternate embodiments, if ISR 716 has already accumulated sufficient execution time statistics on some (but not all) hardware events, the table may be used for hardware events with known execution times. However if ISR 716, encounters an event with unknown execution time, then ISR 716 may immediately service the accumulated events with known execution times (that can fit with in the ISR Time Limit) in the current instance, and then exit without clearing interrupt status bit of ASIC 726 so that another ISR will be invoked to service the event with an unknown execution time. This would prevent ISR 716 from accidentally exceeding the prescribed time limit. Of course each ISR code-portion associated with an event should always complete within the ISR Time Limit.

As noted, if a deferred procedure call is required to handle any of the hardware events, a DPC request is made to the operating system by ISR 716. Since more than one hardware event may require a DPC to be handled, device driver 712 maintains a local dpc-ring 746 containing a dpc-object associated with each event that requires a DPC for handling.

Figure 14:
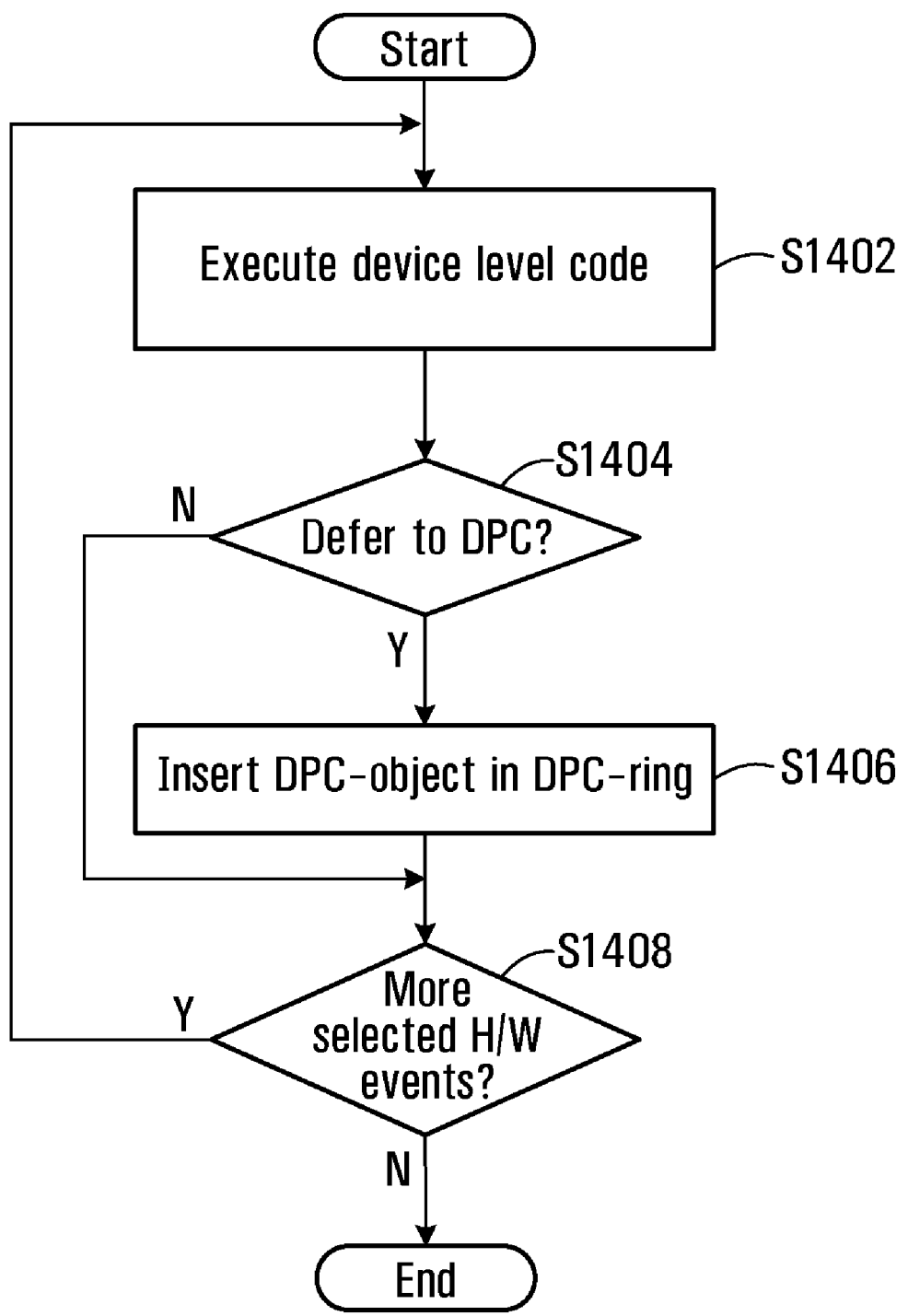
FIG. 14 is a flowchart illustrating steps taken by an exemplary interrupt service routine code portion (ISR code-portion) running within the ISR of FIG. 13.

An ISR code-portion 736 may execute as depicted in FIG. 14. Specifically, after processor 102' raises its IRQL to DEVICE level, it executes ISR code-portion 736 to service a hardware event (S1402). If the hardware event should be handled via a deferred procedure call (S1404), then a local dpc-object may be inserted into dpc-ring 746 (S1406). A local dpc-object 748 is essentially a data structure that identifies a DPC code-portion (also called a dpc-client or a dpc-callback routine) in device driver 712. If more selected hardware events remain (S1408), their corresponding DEVICE-LEVEL code is executed (S1402), and any dpc-objects inserted into dpc-ring 746.

Storage in dpc-ring 746 should be sufficiently large to receive as many dpc-objects are necessary under normal operating conditions to avoid buffer overflow. For example a buffer capable of storing 1024 objects may be used for a graphics card.

As noted, a DPC is a thread that is executed at DISPATCH level, effectively as a software interrupt. A DPC, therefore, has priority over conventional (i.e. non-interrupt) threads that execute, although a DPC may be preempted by a higher level interrupt, that may be serviced by an ISR. Accordingly when there are no interrupt service routines running, kernel 710 through its DPC dispatcher 766 may de-queue a DPC OBJECT 762 and call the associated DPC 744. A DPC OBJECT 762 is essentially a data structure that identifies a DPC in device driver 712.

The local dpc-ring 746 may accumulate more dpc-objects than can be executed within the DPC Time Limit. However, DPC 744 will only de-queue and execute dpc-clients that will complete within the DPC Time Limit. This is further depicted in FIG. 15.

Specifically, upon invocation, DPC 744 may examine dpc-ring 746 (S1502) to identify the hardware events that initiated the deferred procedure call. If a table of DPC execution times (e.g. TABLE II) is ready for use (S1504), DPC 744 may initialize a storage $T_{TOTAL}$ (S1506) used to calculate the total time needed to service the hardware events.

As is the case for ISR execution times, initially TABLE II may be empty or may not accumulate enough statistical data to provide reliable estimates of execution times. The execution time estimates improve with more invocations of DPC 744. After a sufficient number of invocations, the computed averages will be sufficiently reliable for use and the table is may be used (S1504).

If the table of execution times is ready for use and $T_{TOTAL}$ is initialized (S1506), if there are dpc-objects to be processed (S1508), then the execution time associated with the current dpc-object's ISR-code portion ($\Delta t$) is read from TABLE II (S1510). $T_{TOTAL}$ is incremented by $\Delta t$ (S1512). If the DPC Time Limit has not been reached (S1514) the dpc-object's dpc-client code is marked or selected to run in the current DPC invocation (S1516) and the next dpc-objects (if any) are examined (S1508, S1510).

If either the DPC Time Limit is reached (S1514), or all events are found to fit within the DPC time limit (S1508), then the clients selected to run in the current instance of DPC 744 are executed (S1520) and the table of execution times is subsequently updated with the most recent execution time statistic (S1522). If dpc-ring 746 is not empty, then DPC 744 requests a DPC thereby scheduling itself to run again to process the remaining dpc-objects in dpc-ring 746.

The advantage of handling hardware events using embodiments described above may now be appreciated by comparing it to conventional interrupt handling. In a conventional device 100, each hardware event leads to the generation of an interrupt by peripheral device 104 which is sent to processor 102. In contrast, in an exemplary embodiment of the present invention, a single interrupt is sent to processor 102' in response to multiple hardware events (from logic unit 106'). Using one interrupt signal and its associated ISR to handle multiple hardware events increases efficiency as each event is handled with a reduced interrupt overhead (per hardware event).

Denoting the average interrupt handling overhead as $\Delta t_{isr}$, it can be seen that handling multiple hardware events (from logic unit 106') using a single ISR execution results in increased performance. The overhead $\Delta t_{isr}$ is incurred only once since only one actual interrupt is sent to processor 102'. Thus it is readily seen that in an exemplary embodiment of the present invention, in which M hardware events (from logic unit 106') result in a single actual interrupt being sent to the processor, a reduction of $(M-1)\Delta t_{isr}$ may be realized, in interrupt handling time. Thus, the more local hardware events are signaled to the processor by a single actual interrupt, the greater the advantage. This performance improvement becomes even more pronounced for multiple peripheral devices interconnected to the same processor on a given machine.

Figure 15:
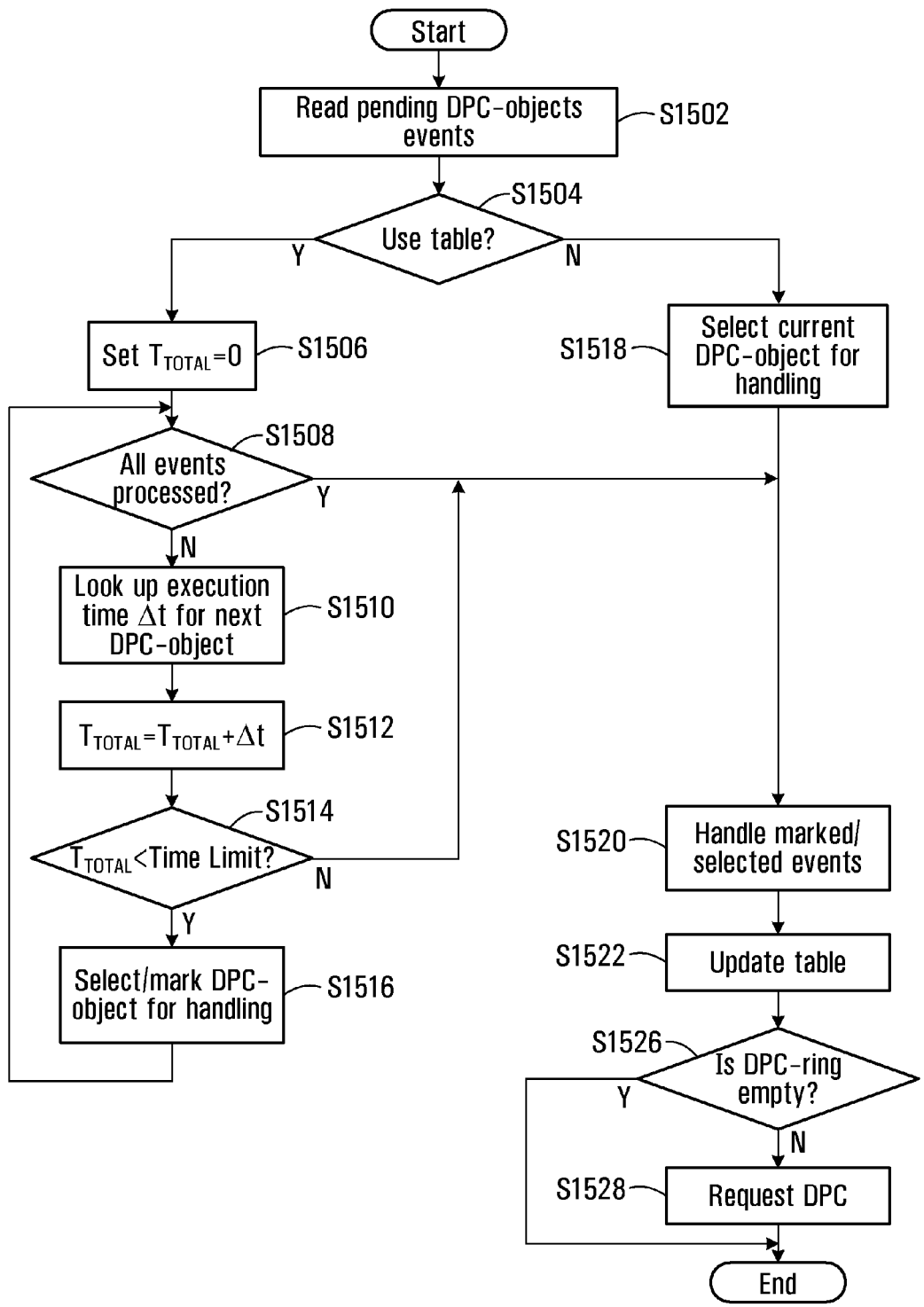
FIG. 15 is a flowchart illustrating the steps taken by an exemplary deferred procedure call (DPC), to complete tasks deferred by the ISR of FIG. 13.
Figure 16:
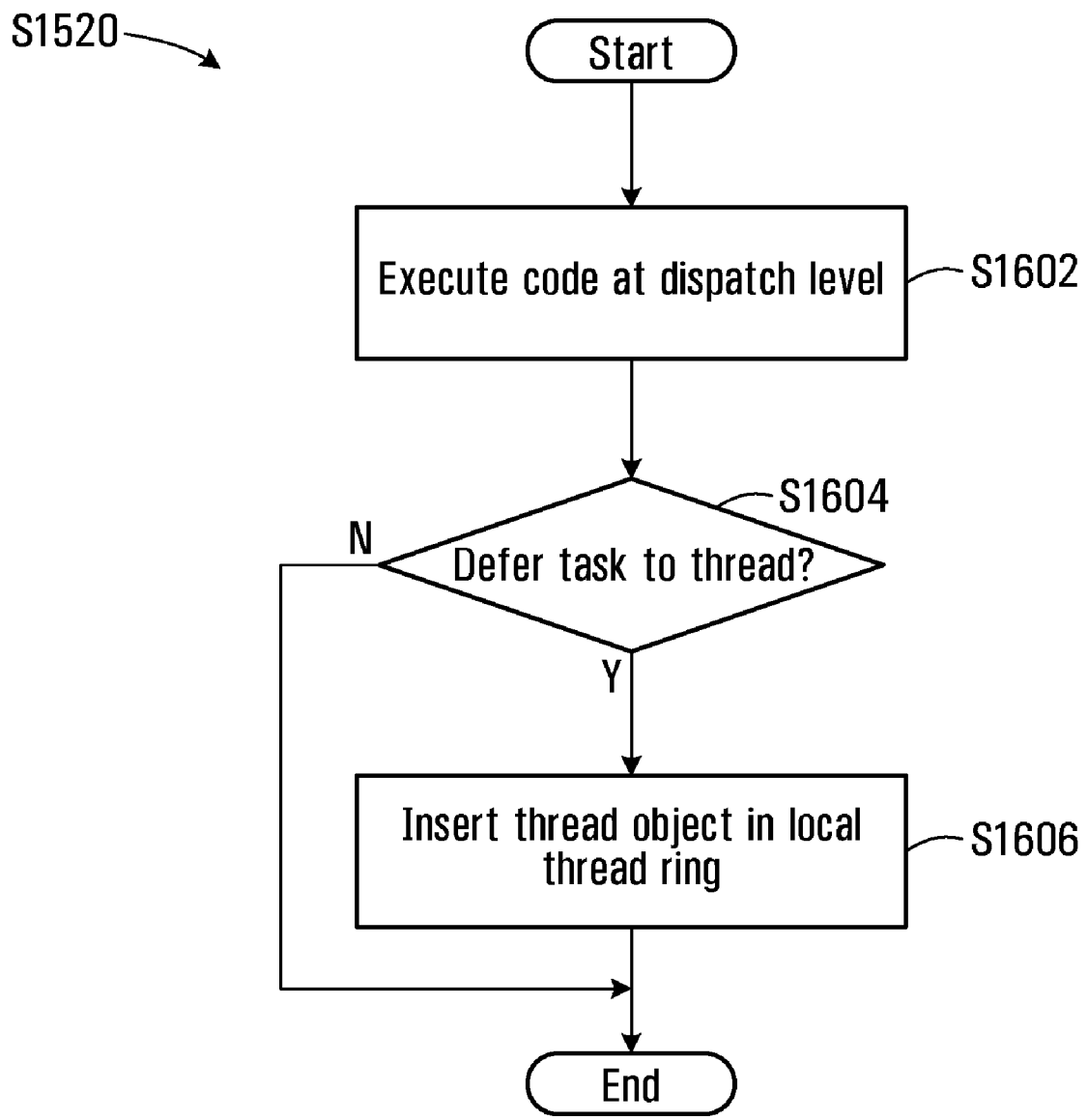
FIG. 16 is a flowchart illustrating the execution steps of DPC code-portion that executes within DPC of FIG. 15.

FIG. 16 depicts steps involved within step S1520 of FIG. 15. In particular, a DPC code-portion associated with a current dpc-object may perform the steps outlined in the flowchart of FIG. 16. In step S1602, the DPC code-portion executes at DISPATCH level. In step S1604, if the DPC code-portion has tasks that could be executed at PASSIVE level, a local worker-thread object is inserted into a local worker-thread ring 754 (S1606). Otherwise, DPC code-portion may exit directly from step S1604.

Using worker-threads reduces the number of high priority tasks vying for processor 102'. Worker threads are dispatched by thread dispatcher 768, in the ordinary course. It is thus advantageous to execute tasks that could be run at PASSIVE level as worker-threads rather than as DPC code-portions.

Worker-threads may also be used for tasks that must wait for some event such as availability of a particular resource. In this case, a worker-thread may go to sleep, and wait on a signal that may be sent from a DPC code-portion, to wake up and execute.

As with interrupts, it is easily seen that for K local DPC code-portions executed during an instance of DPC 744, an overhead time savings of $(K-1)\Delta t_{dpc}$ is realized, where $\Delta t_{dpc}$ represents the average overhead associated with executing a single deferred procedure call.

Figure 17:
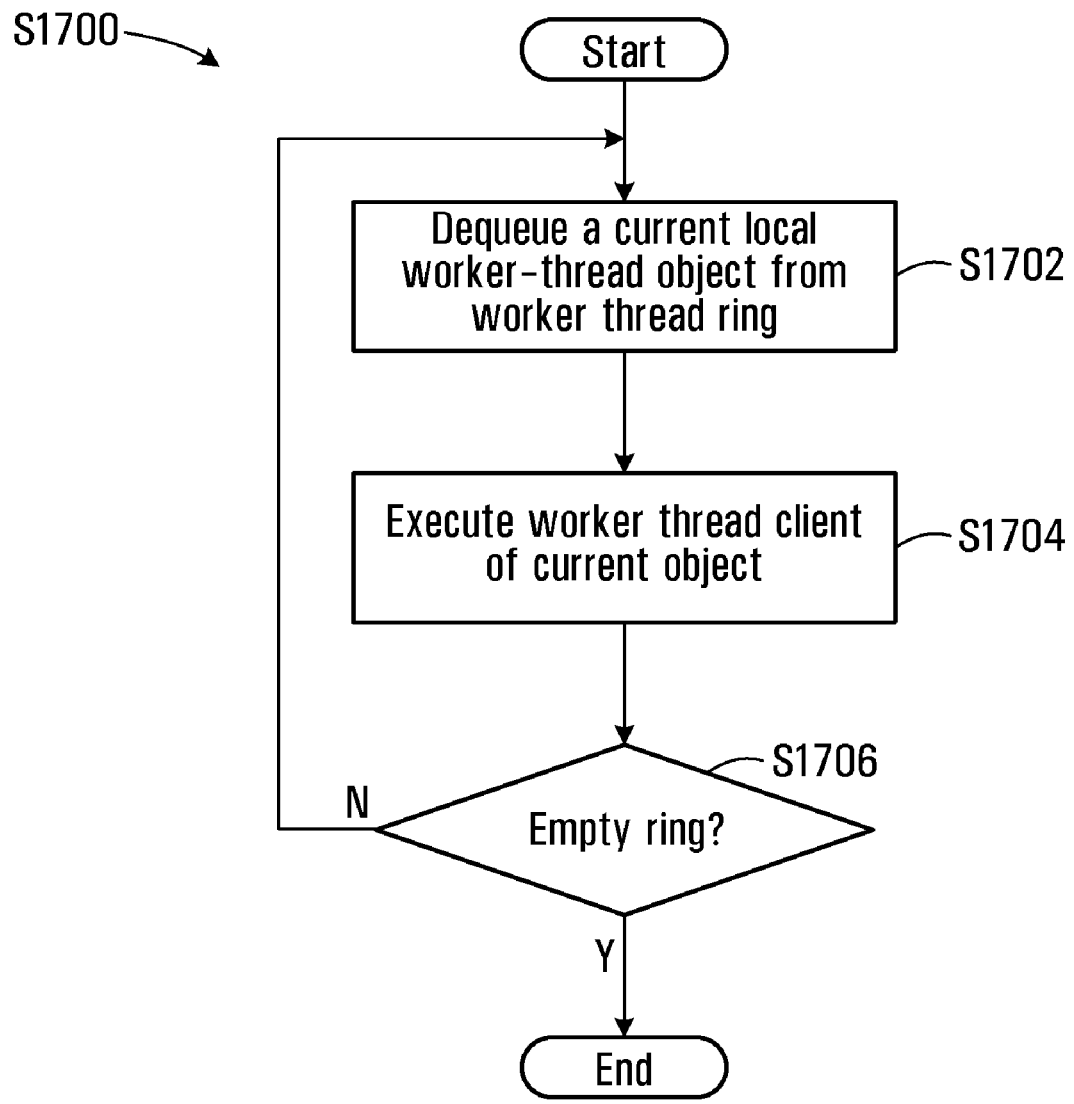
FIG. 17 is a flowchart illustrating the steps taken by an exemplary worker-thread, to complete tasks deferred by the DPC of FIG. 15.

FIG. 17 depicts steps S1700 that may be carried out by a worker-thread 756. When scheduled to run (by thread scheduler 768), worker-thread 756 executes on processor 102' at PASSIVE level, allowing preemption by hardware and software interrupts. Specifically, when worker-thread 756 executes, it may de-queue a local worker-thread-object 758 form local worker-thread ring 754 (S1702). Once worker-thread object 758 is de-queued, its associated worker-thread code-portion 756 is executed (S1704) at PASSIVE priority level. After a current worker-thread code-portion completes, worker-thread ring 754 examined by the worker-thread for additional worker-thread objects 758 (S1706). If the worker-thread-ring is not empty, the worker-thread continues to de-queue (S1702) the next worker-thread object. However, if the worker-thread-ring is empty, the worker-thread call completes and exits.

In alternate embodiments, hardware events may be serviced in their order of arrival. Instead of using dedicated bits in a register to record hardware events, a hardware-event queue or some other representation of an ordered set hardware event identifiers may be used. In one particular embodiment, a hardware-event ring (similar to dpc-ring 746) formed in system memory 112' may be used to keep track of hardware events instead of a hardware event status register 732. ASIC 726 may insert a hardware-event object (similar to a dpc-object), whenever a hardware event occurs. Likewise, ISR 716 may then de-queue a hardware-event object from the hardware-event ring and execute an associated ISR code-portion to service the hardware event corresponding to the de-queued object. ASIC 726 may send an interrupt signal to processor 102' whenever the hardware-event ring is not empty.

In alternate embodiments, the calculation of average execution times may be improved by utilizing more efficient algorithms. Various optimization methods will be apparent to those with ordinary skill in the art.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of servicing multiple hardware events in a peripheral device by a processor in a computing device, said method comprising:
   upon each occurrence of one of said hardware events, recording an event indicator corresponding to said hardware event, and determining an acceptable period before which an interrupt should be generated to service said hardware event;
   if said acceptable period is smaller than a current value of a timer at said peripheral device, adjusting said timer to a value within said acceptable period;
   upon expiry of said timer, asserting a first interrupt to said processor; and
   in response to said first interrupt, executing software code on said processor to:
      identify a plurality of unserviced hardware events based on said event indicators;
      identify execution times associated with servicing said plurality of unserviced hardware events;
      determine a subset of said plurality of unserviced hardware events whose combined execution times take no longer than a predefined time limit;
      service said subset of said plurality of unserviced hardware events;
      clear those event indicators corresponding to said subset of said plurality of unserviced hardware events;
      upon completion of said executing said software code, asserting a further interrupt to said processor if at least one of said event indicators remains set, and
      in response to said further interrupt, executing said software code on said processor to service unserviced hardware events.

2. The method of claim 1, wherein said recording comprises recording an event indicator of said hardware event in a register.

3. The method of claim 1, wherein said recording comprises recording an event indicator of said hardware event in a queue.

4. The method of claim 1, wherein said software code executing on said processor comprises an interrupt service routine that completes within a predetermined time limit.

5. The method of claim 4, wherein software code to service said subset of said plurality of hardware events for which an event indicator has been recorded is executed within said predetermined time limit.

6. The method of claim 4, further comprising signaling said peripheral device to stop interrupting, when all of hardware events for which an event indicator has been recorded have been serviced.

7. The method of claim 4, wherein said interrupt is generated by asserting an interrupt line and said peripheral device asserts said interrupt line as long as at least one of said plurality of hardware events is not serviced within said predetermined time limit.

8. The method of claim 1, wherein said determining comprises looking up a value for said acceptable period from memory in said computing device, accessible to said peripheral device.

9. The method of claim 8, wherein said memory is in said peripheral device.

10. The method of claim 1, wherein said software code comprises a hardware interrupt service routine (ISR) that may only be interrupted by higher priority hardware interrupts.

11. The method of claim 10, wherein said ISR comprises code portions, each of said code portions for servicing a corresponding one of said multiple hardware events.

12. The method of claim 10, wherein said ISR determines if said subset of said plurality of unserviced hardware events requires at least one deferred procedure, that when executed, may be interrupted by hardware interrupts, and upon determining that said least one deferred procedure is required, requests said processor to execute said at least one deferred procedure.

13. The method of claim 12, wherein said requesting comprises queuing said at least one deferred procedure with a dispatcher managed by an operating system of said computing device.

14. The method of claim 13, wherein said queueing comprises inserting a data structure corresponding to said deferred procedure in a queue managed by said operating system of said computing device.

15. The method of claim 12, wherein said deferred procedure includes a plurality of deferred procedure code portions, collectively taking less than an estimated threshold time to execute.

16. The method of claim 15, wherein said ISR queues data structures corresponding to said deferred procedure code portions in one or more local queues managed by a device driver for said peripheral device.

17. The method of claim 15, wherein said software code further comprises code to be executed under control of a thread scheduler, and wherein said deferred procedure places said code to be executed by said thread scheduler in queue with said thread scheduler.

18. A computing device comprising a processor, and memory storing software executable by said processor, said software adapting said computing device to:
in response to receiving a first interrupt request from a peripheral device, said first interrupt asserted upon an expiry of a timer at said peripheral device, execute an interrupt service routine (ISR) to:
identify a plurality of unserviced hardware events based on event indicators, each event indicator set upon occurrence of a corresponding unserviced hardware event of said plurality of unserviced hardware events;
identify execution times associated with servicing said plurality of unserviced hardware events;
determine a subset of said plurality of unserviced hardware events whose combined execution times take no longer than a predefined time limit;
service said subset of said plurality of unserviced hardware events;
clear those event indicators corresponding to said subset of said plurality of unserviced hardware events; and
in response to receiving a further interrupt request from said peripheral device, said further interrupt request asserted upon completing said interrupt service routine and determining at least one of said event indicators remains set, execute said interrupt service routine to service unserviced hardware events.

19. The computing device of claim 18, wherein said processor elevates its interrupt request level (IRQL), so that only an interrupt of a higher IRQL than said interrupt request from said peripheral device can interrupt said processor while executing said ISR.

20. The computing device of claim 18, wherein software further adapts said computing device to:
queue deferred procedures with a deferred procedure dispatcher managed by an operating system of said computing device; and
execute said deferred procedures in response to said ISR queueing said deferred procedure with a deferred procedure dispatcher managed by an operating system of said computing devices.

21. The computing device of claim 20, wherein said processor elevates its interrupt request level (IRQL) so that hardware interrupts can interrupt said processor while executing said deferred procedure.

22. The computing device of claim 20, wherein software further adapts said computing device to:
execute a thread that executes in response to said deferred procedure requesting said thread.

23. The computing device of claim 22, wherein said processor sets its interrupt request level (IRQL) when executing said thread, so that hardware interrupts and software interrupts can interrupt said processor while executing said thread.

24. A computing device comprising a processor interconnected to a peripheral device through an interrupt request line, and memory storing software executable by said processor, said peripheral device comprising a microcontroller executing device code adapting said peripheral device to generate a first interrupt to said processor in response to a plurality of unserviced hardware events originating in said peripheral device;
said software adapting said processor to execute an interrupt service routine (ISR) in response to said first interrupt to:
identify said plurality of unserviced hardware events based on event indicators, each event indicator set upon occurrence of a corresponding unserviced hardware event of said plurality of unserviced hardware events;
identify execution times associated with servicing said plurality of unserviced hardware events;
determine a subset of said plurality of unserviced hardware events whose combined execution times take no longer than a predefined time limit;
service said subset of said plurality of unserviced hardware events;
clear said event indicators corresponding to said subset of said plurality of unserviced hardware events; and
said device code further adapting said peripheral device to generate a further interrupt to said processor in response to completing said interrupt service routine and determining at least one of said event indicators remains set;
said software further adapting said processor to execute said interrupt service routine in response to said further interrupt to service unserviced hardware events.

25. The device of claim 24, wherein said software further adapts said processor to invoke at least one deferred procedure that may be interrupted by hardware interrupts.

26. The device of claim 25, wherein said at least one deferred procedure causes a thread to be executed by said processor at an interrupt request level lower than that associated with a deferred procedure.

* * * * *